United States Patent
Rothschild

(10) Patent No.: US 7,503,059 B1
(45) Date of Patent: Mar. 10, 2009

(54) METHOD OF ENHANCING MEDIA CONTENT AND A MEDIA ENHANCEMENT SYSTEM

(75) Inventor: Leigh M. Rothschild, Miami, FL (US)

(73) Assignee: Rothschild Trust Holdings, LLC, Sunny Isles Beach, FL (US)

( * ) Notice: Subject to any disclaimer, the term of this patent is extended or adjusted under 35 U.S.C. 154(b) by 1439 days.

(21) Appl. No.: 10/034,832

(22) Filed: Dec. 28, 2001

(51) Int. Cl.
*H04N 7/173* (2006.01)
*H04N 5/445* (2006.01)
*H04N 9/475* (2006.01)
*G06F 3/00* (2006.01)

(52) U.S. Cl. .......... 725/113; 725/60; 725/112; 715/719; 348/513

(58) Field of Classification Search .......... 725/60, 725/112, 113; 715/719; 348/513
See application file for complete search history.

(56) References Cited

U.S. PATENT DOCUMENTS

| | | | | |
|---|---|---|---|---|
| 5,479,268 A | * | 12/1995 | Young et al. | 386/83 |
| 5,624,265 A | * | 4/1997 | Redford et al. | 434/307 R |
| 6,438,751 B1 | * | 8/2002 | Voyticky et al. | 725/42 |
| 6,678,866 B1 | * | 1/2004 | Sugimoto et al. | 715/203 |
| 6,857,130 B2 | * | 2/2005 | Srikantan et al. | 725/93 |
| 7,120,924 B1 | * | 10/2006 | Katcher et al. | 725/60 |
| 7,219,173 B2 | * | 5/2007 | Sha et al. | 710/61 |
| 2002/0078456 A1 | * | 6/2002 | Hudson et al. | 725/60 |
| 2003/0018609 A1 | * | 1/2003 | Phillips et al. | 707/1 |
| 2004/0261127 A1 | * | 12/2004 | Freeman et al. | 725/135 |
| 2006/0143559 A1 | * | 6/2006 | Spielberg et al. | 715/512 |

* cited by examiner

*Primary Examiner*—Hoang-Vu A Nguyen-Ba
(74) *Attorney, Agent, or Firm*—Anthony J. Casella; Gerald E. Hespos

(57) ABSTRACT

A media enhancement system and method, the system including a media player structured to deliver a media selection to a user and an enhancement registry associated with the media selection and including time data and/or other data associated with the media selection and a communicative link to additional materials. A user interface is further provided and operatively associated with the media player to receive a user input during delivery of the media selection by the media player, the media player further structured to identify a corresponding time marker of the media selection at a time that corresponds receipt of the user input. Finally, an activation assembly is provided to access the enhancement registry and to correspondingly activate the communicative link for delivery of the additional materials to the user.

32 Claims, 3 Drawing Sheets

METHOD OF ENHANCING MEDIA CONTENT AND A MEDIA ENHANCEMENT SYSTEM

BACKGROUND OF THE INVENTION

1. Field of the Invention

The present invention relates to a system and method for enhancing media content, and preferably for enhancing existing media content, by providing users with access to large quantities of additional materials that relate to a specific media selection without requiring special encoding and/or modification of the media selection, but which can still be precisely related to specific parts of the media selection.

2. Description of the Related Art

There are presently a variety of different technologies available to deliver media selections, such as audio, video, audio/video, etc. to users in an effective and beneficial format. Moreover, there is a substantial volume of material available over computerized networks, such as the Internet, which may or may not be related to specific media selections. Unfortunately, although a user may independently seek out additional materials and information associated with a specific media selection, presently no specific and effective facility exists for effectively enhancing a media selection with quantities of additional materials, without requiring separate independent machinery and separate and independent programming on the medium itself. Indeed, such is especially the case with regard to the large amounts of media already distributed and in use by the public.

Recent technological advances have made significant strides in what may be termed, enhanced DVDs or similarly enhanced media delivery products including CD-ROMs, hard drives, digital storage devices, and the like. These existing enhancements include the embedding and/or programming of additional content onto a specific media storage medium, such as the DVD, for effective communication to the user. As a result merchants are able to sell these various media selections while promoting substantial enhancements, which can expand the markability of a product which may or may not have already been viewed and/or heard by the consumer at a previous time. To this end, enhanced media players are also being developed continuously to take advantage of these enhanced media selections and avoid the need to use personal computers. Specifically, these media players may include Internet connectivity and/or a variety of other features that may previously have only been available on specific computer processors which also had media delivery capabilities. While such existing technologies are effective and beneficial for the purposes of enhancing new releases and publications of various types of media selections, as indicated they are generally incapable of providing any enhancement capability whatsoever to already distributed media selections and/or live or remotely delivered media selections, such as through a cable or satellite system. Moreover, the enhancement provided with existing technology can become somewhat stagnant since the available additional materials and type of interaction or enhancement must be pre-programmed onto the storage medium, and thereby are permanently set. Also, typical enhancements available with present technologies are often provided in the form of add-ons which are available and accessible separate and apart from the delivery of the actual media selection itself such that there is no true, direct interactivity with the actual media selection being delivered, but rather later, separate opportunities for independent access and/or retrieval of additional materials are provided.

As such, it would be highly beneficial to provide a media enhancement system and method which is capable of direct, contemporaneous enhancement of a media selection being delivered so as to achieve true interactivity between a user and the media selection being delivered. Furthermore, such a system and method should be capable of continuous updating and/or modification by a controlling entity so as to continuously refresh and make attractive the delivery of a particular media selection, and/or tailor the type of enhancement to its audience. Moreover, such a system and method should be capable of being effectively utilized to its full capacity with any media selection, whether it is being delivered live, being delivered from a remote location, or being delivered via a local and/or removable storage medium that has been newly programmed or was pre-programmed and distributed before the availability of such technology. As a result, the enhancement capabilities would not be limited only to new releases of media selections.

SUMMARY OF THE INVENTION

The present invention relates to a system and method of enhancing media content, and in one embodiment a method of enhancing existing media content. In particular, a preferred embodiment of the method of the present invention includes first the generation and storage of an enhancement registry for a particular media selection, the enhancement registry including at least time data that is associated with the media selection, as well as a communicative link to additional materials. Furthermore, a media storage medium containing the media selection is then associated with a corresponding media player, and the media selection is identified and played. A user input may then be received and a time marker of the media selection at a time that corresponds the receipt of the user input can be identified. Finally, the time marker may be correlated with the time data of the enhancement registry and a corresponding communicative link may be activated in response thereto. Activation of the communicative link provides immediate and/or subsequent access to additional materials to the user.

Preferably the preceding method can be employed utilizing the media enhancement system also of the present invention. Specifically, the media enhancement system may include a media player that is structured and configured to deliver a particular media selection to a user. Additionally, an enhancement registry is provided. The enhancement registry is associated with the specific media selection and includes time data or other data associated with the media selection. Moreover, the enhancement registry also includes at least one communicative link to additional material, the communicative link preferably, but not necessarily being correlated to the time data.

The present system further includes a user interface. The user interface is operatively associated with the media player and is structured to receive a user input at least during delivery of the media selection by the media player to its intended audience. Moreover, the media player, either independently or in conjunction with an auxiliary device, may identify a corresponding time marker of the media selection, at least at the time that corresponds the receipt of the user input via the user interface. Utilizing this time marker, an activation assembly is preferably provided and structured to access the enhancement registry, correlating the time marker with the time data associated with the particular media selection. In response thereto, the activation assembly can also correspondingly activate, either directly or indirectly, the appropriate communicative link. Activation of the communicative link ultimately results in delivery of the additional materials to the user, either immediately or subsequently as determined by the user, the audience, and/or the system. Accordingly, as a specific media selection is received, whether an audio, audio/video and/or another type media selection, the media selection is enhanced with user interactivity, allowing a user to at least provide a user input in order to effectively retrieve additional material that can be specifically related to the media selection, and more specifically to a portion of the media selection that is being delivered when the user input is generated.

These and other features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Shown throughout the Figures, the present invention is directed towards a media enhancement system, generally indicated as 10, as well as an associated method of enhancing media content, the method preferably being achieved utilizing the enhancement system 10. The enhancement system 10 and method of the present invention are preferably structured and configured so as to effectively and appealingly enhance various types of media selections, including pre-existing media selections. For example, the present system and method can be utilized in connection with audio/visual media, such as movies and other audio/video programming, as well as audio only content, such as music, or other types of developed or to be developed content. For purposes of clarity in explanation, however, a majority of the explanation may be provided in the context of a movie as the media selection even though other types of media selections can be equivalently enhanced. Similarly, the present system is preferably configured to be employed with any of a variety of media storage mediums including compact disks, DVD's, digital data storage chips and/or memory based storage systems, computer hard drives, etc., and in some embodiment remotely stored and transmitted media. Furthermore, the media selection to be enhanced utilizing the present system and method need not be pre-programmed or pre-configured, and special programming and/or content need not be pre-placed on the existing media storage medium for the enhancements to still be utilized to their fullest extent. As a result, the millions of storage media and media selections that have already been sold and are already in the possession of consumers may still be effectively enhanced utilizing the present system and method without requiring modification and/or adaptation of those media selections. Of course, it is also understood that future media storage mediums containing media selections may include some or part of the features of the present system and method, which are to be described, contained thereon, for convenience.

Looking first to the media enhancement system 10 as illustrated in the Figures, it will include a media player 20. As indicated, the media player 20 may be any type of media player 20 which is capable of effectively communicating a media selection to an audience of one or many. Some examples of media players 20 that may be ideally utilized with the present system and method may include DVD players, compact disk players, video CD players, personal video recorders (pvrs), digital memory and/or computer hard drive based players and/or players capable of receiving remote transmissions from a transmission source 26' such as remote server or network, a satellite system and/or cable system, and/or video and/or audio receivers. Furthermore, a multi-function media player 20 capable of incorporating a variety of different media types may also be effectively utilized.

Figure 3:
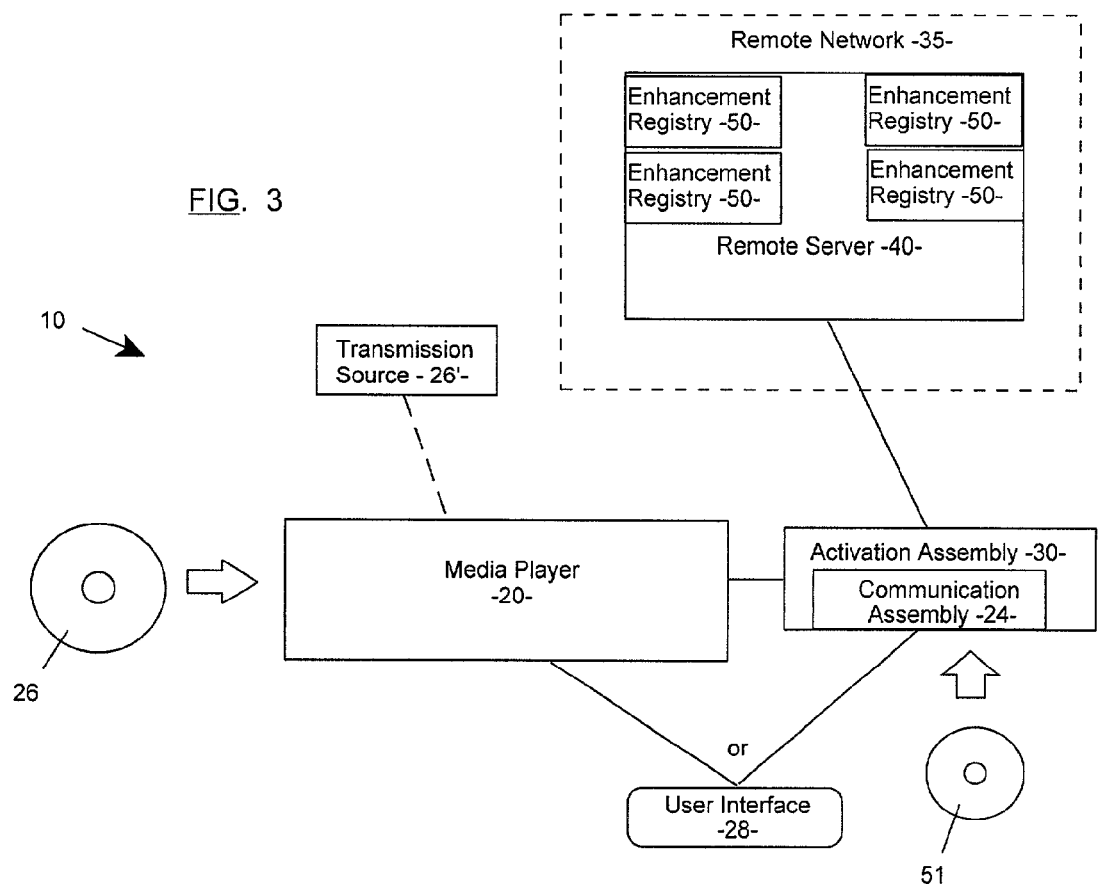
FIG. 3 is a schematic representation of yet another embodiment of the media enhancement system of the present invention.

As illustrated in the Figures, the media player 20 may be configured to receive a media storage medium 26, such as a portable and/or removable storage device including a CD rom and/or DVD, or may include a separate transmission source 26' as illustrated in FIG. 3, the transmission source 26' being either local and/or remote and provides the media selection for delivery. In any of these embodiments, however, the media player 20 is preferably configured so as to deliver a particular media selection to an audience, typically also the user of the system, in a conventional manner.

The present system 10 also includes at least one enhancement registry 50. In particular, one or more enhancement registries 50 may be provided, each preferably associated with a specific media selection which may be played on the media player 20. To this end, each of a variety of different movie titles may have a corresponding enhancement registry 50 associated therewith and/or each of a variety of different songs, albums, television shows, etc. may have a corresponding enhancement registry 50 associated therewith. Along these lines, it is understood that a single enhancement registry 50 may be utilized for multiple media selections in a circumstance where the degree of enhancement and the specificity of the interactivity desired is not as great. Nevertheless, in the preferred illustrated embodiments a plurality of enhancements registries 50 are provided, each media selection that may be effectively enhanced utilizing the present system including at least one, and often multiple types of enhancement registries 50.

The enhancement registry 50 of the present invention that is associated with a particular media selection may be considered a log or similar type data registry and preferably includes various types of information which help to achieve the enhancement of the media selection. Moreover, the specific title or another identifier of the media selection will preferably be identified, such as may be achieved by the media player, thus enabling the appropriate correlation with a corresponding enhancement registry. In the illustrated embodiment the enhancement registry 50 may include at least time data that is associated with the identified media selection. This time data may include a detailed log of frames and/or scenes of the particular media selection such that when a corresponding time point during the play of a media selection is identified, the enhancement registry 50 can correspondingly identify what that scene or frame might be.

Additionally, in at least one embodiment of the present invention, the enhancement registry 50 may also include frame location data associated with a specific location on at least one frame of the media selection. For example, this frame location data may be split into halves, quadrants and/or smaller segments of a particular frame, and/or may be as detailed as being broken down into specific areas where specific items on a particular frame are located. By way of further example, one frame and/or scene of a particular media selection, such as movie may include a variety of products, actors, and other identifiable items. The frame location data effectively identifies at least one of these articles based upon a position thereof in a particular frame. Further, although the time data and the frame location data are the preferred types of data associated with the media selection that are included as part of at least one embodiment of the enhancement registry 50, it is also understood that other types of data which may serve to identify a specific detail or item within a media selection with which some enhancement may be associated, may also be provided.

In addition to the various data entries associated with the enhancement registry 50, the enhancement registry 50 also preferably includes at least one communicative link to additional materials 55. In particular, so as to provide for the effective enhancement of the media selection, the system and method of the present invention will provide additional materials to the user that effectively enhance the media selection. These additional materials 55, which will be described in greater detail subsequently and maybe locally or remotely maintained, may include audio and/or video information on any of a variety of enhancement topics and/or modes. For example, a particular enhancement registry 50 associated with the media selection might be configured so as to provide educational enhancements and/or commerce enhancements. In the case of an educational enhancement, when an individual user selects, as will be described subsequently, a particular item and/or portion of a media selection, based upon the correlation achievable utilizing the data of the enhancement registry 50, specific additional materials that are associated with the selected item and/or section can be provided to the user. In this way a teacher can provide educational materials to students in connection with what is being delivered as the media selection. Similarly, in the sense of a commerce enhancement, a consumer may be given the opportunity to purchase and/or find out more information about specific products, about other media selection, information about a specific actor, product or locality, etc. Indeed, it is recognized that the nature and type of additional materials to be provided so as to enhance a specific media selection may be somewhat limitless, and although only a single article and/or type of additional material may be provided in connection with a specific enhancement registry 50, it is understood that in the preferred embodiment a plurality of communicatively links are provided to a plurality of different types of additional materials 50, the time data and/or frame location data effectively allowing for selection of the appropriate communicative link. Moreover, the additional materials can be informational or commercial in nature, such as providing e-commerce related additional materials that will facilitate an immediate or subsequent purchase of products or services.

Looking in further detail to the media player 20, it preferably includes a user interface 28 operatively associated therewith. The user interface 28 is structured to receive a user input at least during delivery of the media selection by the media player 20. In this regard, the user interface 28 may be an existing remote control and/or interface already associated with the media player 20, and/or may be a separate and/or distinct user interface 28 which is specially configured so as to effectively allow operation of the media enhancement system 10 of the present invention. Specifically, the user interface 28 is structured to at least receive a user input so as to effectively identify the content which a user desires to enhance and/or trigger the enhancement. To this end, the user interface 28 may merely be a selector button which the user can effectively actuate when enhancement is to be achieved, and/or in the case of an audio visual media may include a location indicator such as a pointer or marker which may be visible on a corresponding video monitor, the pointer/marker allowing a user to specifically select a location on a frame or in a scene for providing enhancement. Of course, it is also recognized that more elaborate and/or complex user interfaces 28 may be provided, including interfaces requiring a variety of steps so as to trigger and/or indicate enhancement. Moreover, a variety of different technologies may be effectively utilized so as to signal to the present system 10 that a user input has been made. Also, the user input may be made by a specific viewer and/or receiver of the media selection, and/or may be provided by another user either local and/or remote to the delivery of the media selection, such as in the case of a controlled media delivery. For example, the media selection may be being delivered as part of a remotely controlled movie, etc., premiere and/or educational presentation, and thus the user input may be provided remotely and/or locally so as to achieve desired enhancements for the recipient of the delivery of the media selection. Moreover, in this and other embodiments, multiple deliveries of the additional materials can be provided and/or accessed at once, and indeed, the delivery of content, either of the media selection or the additional materials could be simultaneously controlled either from a single source or as a result of user inputs on all associated media players for a simultaneous and coordinated experience. In such an embodiment a teacher could control the delivery of a media selection and/or additional materials associated with the media selection to various students based upon user inputs from one or more students or a coordinated lesson plan. Additionally, a messaging system can be integrated for further communication and coordination.

At least upon receipt of a user input utilizing the user interface 28, the media player 20 of the present invention either independently and/or though an auxiliary device and/or auxiliary programming is preferably configured to identify at least a corresponding time marker of the media selection at a time that the user input is received. Furthermore, in the embodiment wherein frame location data is also provided, the user input is also preferably configured to identify a particular location on a specific frame and/or scene of the media selection that corresponds the entry of the user input. Still, in this embodiment as well as with regard to the entry of the time data, the media player 20 may effectively identify these characteristics by internal programming and facilities, or may do so merely by transmitting and/or allowing the retrieval of synchronization data and/or identification data relating to the play of the media selection. Moreover, in the case of the frame location data it is also understood that the correlation of a position may be done completely remote from the media player 20, so long as the user that provides the user input can identify the location for making their selection. In particular, once the location on a particular frame and/or particular scene has been identified, the location entered by the user input can be physically made on the media player 20, or may be made in a simulated fashion via a separate device, the correlations between the simulated location of a pointer being easily associated with the actual frame. Moreover, that information is sufficient to correspond with the frame location data of the enhancement registry.

Figure 1:
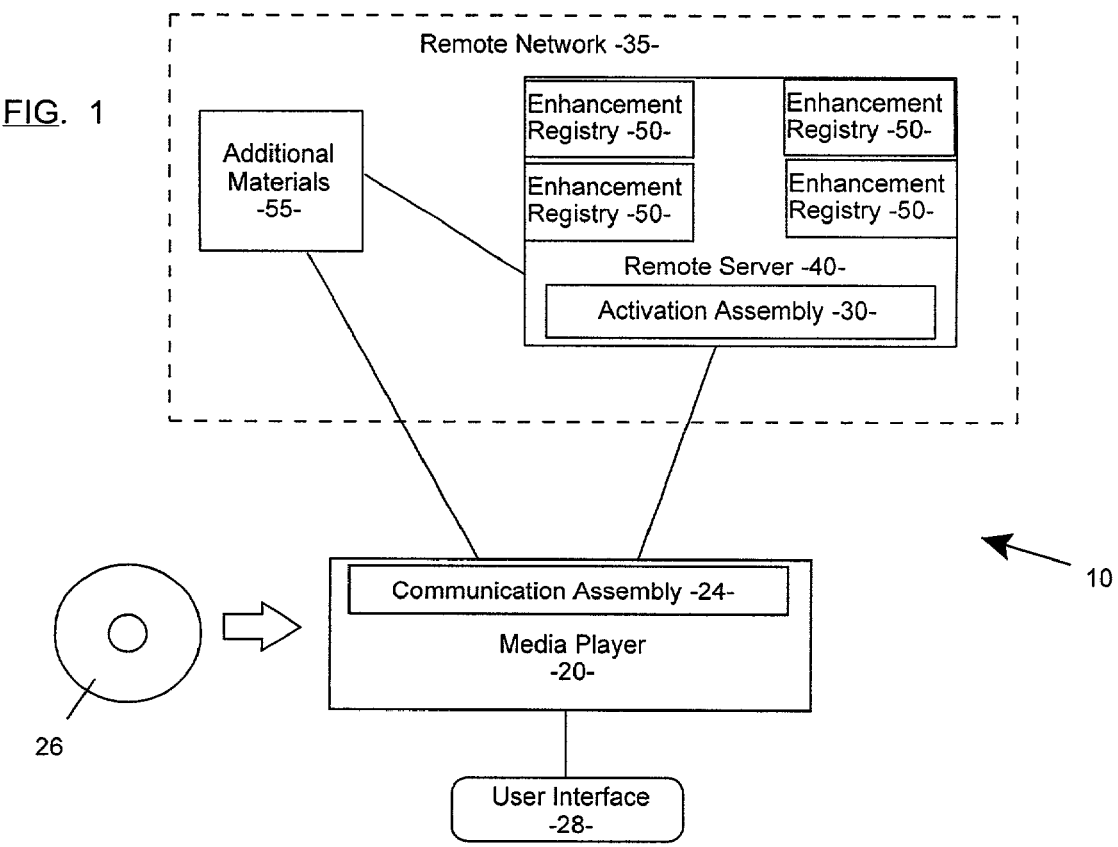
FIG. 1 is a schematic representation of one embodiment of the media enhancement system of the present invention.
Figure 2:
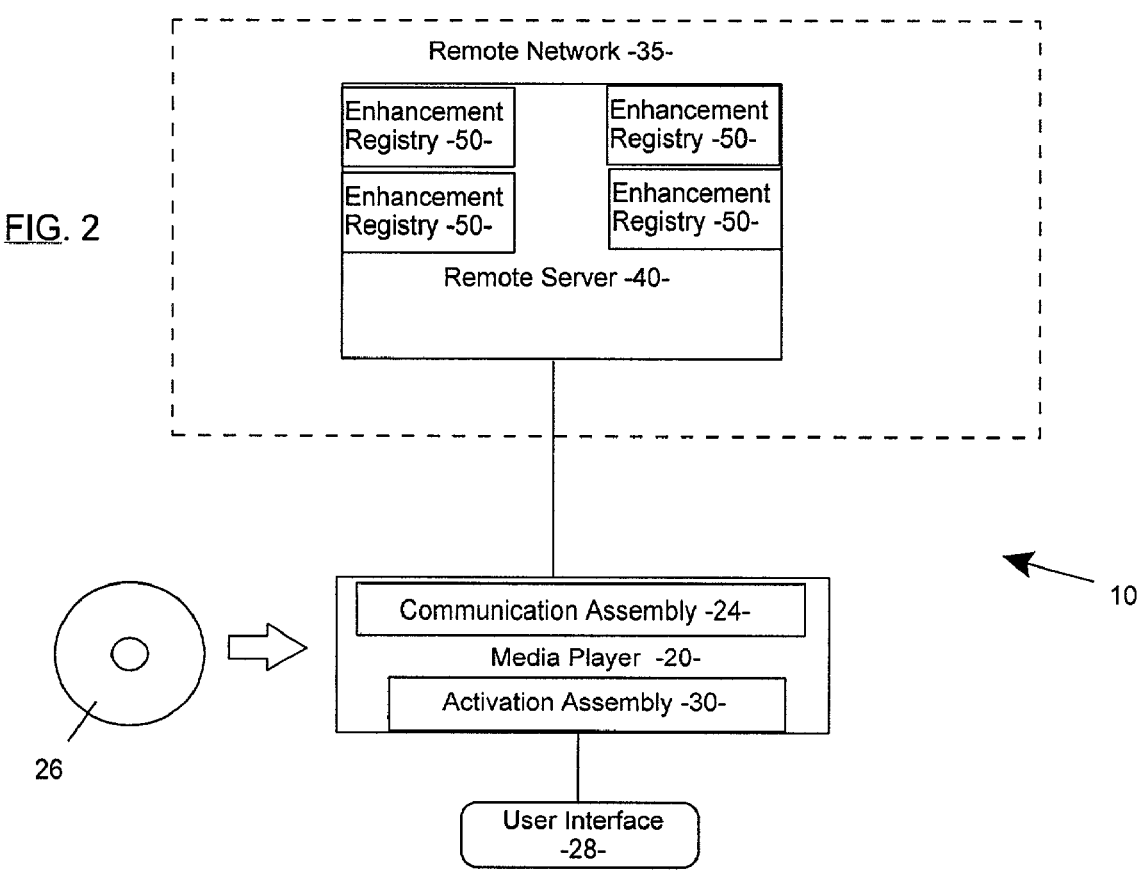
FIG. 2 is a schematic representation of another embodiment of the media enhancement system of the present invention.

In order to achieve many of the functions and enhancements utilizing the present media enhancement system 10, an activation assembly 30 is also preferably provided. The activation assembly 30 may be a completely separate unit from the media player 20, as illustrated in FIG. 3, and thus is merely operatively and communicatively associated therewith, or may be integrated directly into the media player 20, as in the embodiment of FIG. 2, such as in the form of an integrated circuit/chip and/or specified programming that can be provided to the media player 20 either upon manufacture and/or subsequently, or as in the embodiment of FIG. 1, the activation assembly 30 may be completely remote from the media player 20 on a remote network. In such an embodiment, the activation assembly 30, upon identifying or receiving identifying information regarding the media selection, is structured to access the enhancement registry 50 that corresponds the particular media selection. In an embodiment wherein one or more enhancement registries 50 are provided for the same media selection, as in the case of different types of educational enhancement registries, commercial enhancement registries, etc., the activation assembly 30 effectively identifies which enhancement registry is desired by the user. As will be described later with regard to the embodiment of FIG. 3, this may be achieved by utilizing a specific removable storage medium 51, such as a CD rom or DVD-Rom, which contains all or some of the additional materials and/or the enhancement registry and can be provided as a companion article to the specific media selection, thus dictating the nature and type of enhancement. Also, it is noted that a facility whereby the user selects one from a number of enhancement registries may also be utilized.

In addition to identifying what the media selection is and the corresponding enhancement registry 50, the activation assembly 30 is also responsive to the user input, either directly and/or via the media player 20, so as to identify a specific time of a user input and/or a specific location on a frame and/or scene corresponding the user input. With this information from the user input, the activation assembly 30 is structured to effectively identify and preferably activate a corresponding communicative link for delivery of the additional materials 55 to the user. In this regard, the activation assembly 30 may be permanently and/or selectively programmable so as to a immediately provide any additional materials and/or to merely activate the communicative link for later, subsequently retrieval and/or delivery of the additional materials to the user, either as dictated by the user, and/or as dictated by operator and/or controllers of the additional materials. As such, if an individual is watching a specific movie and wishes to achieve an enhancement with regard to a particular frame or scene, they can provide a user input and any additional materials may be either provided immediately, thus stopping and/or over-riding the delivery of the media selection, or may be logged and/or stored for subsequent delivery at a more convenient time. To this end, it is also recognized that remote and/or local control over the play of the media selection may be provided, such as when the additional materials are provided and/or over the additional materials themselves. Accordingly, a user can ensure that none of the media selection is missed during presentation of the additional materials, and/or can ensure that the appropriate additional materials are provided. For example, the additional materials to be delivered may be based on the specific recipient thereof, such as in response to inquiries made about the viewer during a registration, questioning period, or over time due to viewing patterns.

Again looking to the preferred embodiments of the present invention, and those embodiments illustrated on the Figures, it is preferable that the media enhancement system 10 of the present invention take advantage of a remote network 35, such as the Internet even though the enhancement registry(s) and/or additional materials may be provided on a storage medium. Specifically, a remote network 35 such as the Internet and/or smaller private networks are preferably effectively utilized so as to eliminate the need to contain additional materials and enhancement registries 50 directly on the media storage medium 26 which provides the media selection, and/or directly on the media player 20. Of course, it is understood that these alternatives can also be effectively employed. By utilizing a remote network 35, a substantially large volume of additional materials and types of enhancements registries 50 and/or additional materials for a large number of different media selections may be effectively contained, maintained, and updated and/or modified as may be appropriate on one or more servers or computers for access by one or more users. For example, it is understood that there are a very large number of media selections currently being sold and/or being developed which may be appropriate for enhancement. As a result, in the preferred embodiment each of these specific media selections includes at least one and often more than one enhancement registry 50, and may require large amounts of additional materials 55 depending upon the number and/or nature of the communicative links of the enhancement registry 50.

In order to effectively achieve interaction with a remote network, the present invention also preferably includes a communication assembly 24. The communication assembly 24 may be integrated directly into the media player 20, such as in the case of enhanced DVD player or personal computer including media play back capabilities, and/or may be integrated into a companion device, such as may contain the activation assembly 30 of FIG. 3. In either such embodiments, the communication assembly 24, which may include a traditional Internet connection, is configured so as to effectively provide a communicative link to the remote network 35, and in some embodiment so as to provide a communicative link to specific remote server 40 and/or the additional materials 55 directly. For example, in an embodiment wherein a remote server 40 is included, the remote server 40 is preferably provided so as to effectively contain and/or manage the enhancement registries 50. To this end, the remote server 40 may include the enhancement registries 50, especially in an embodiment wherein the enhancement registries 50 are not contained on the media storage medium 26 and/or a separate storage medium 51. Depending upon the embodiment of the present system that is utilized, the remote server 40 may be configured so as to communicate the enhancement registry 50 to the media player 20 and/or to the activation assembly 30 directly, whether it is part of the media player 20 or part of an associated device. Moreover, however, the remote server 40 may itself contain the activation assembly 30, it being configured to receive the user input and correspondingly correlating information from the media player 20 so as to effectively achieve the functionality of the activation assembly 30 at the remote server 40. Still, regardless of the embodiment it is understood that one or more of the specific configurations and/or locations of the activation assembly 30 and effective correlation and activation of the communicative link may be achieved, including the downloading of enhancement registry 50 information from the remote server 40 to the media player 20 and/or an associated device containing the activation assembly 30. Moreover, the remote server 40 may function as a portal through which the additional materials 55 are accessed, may contain the additional materials, and/or may merely facilitate the identification of a specific communicative link, that communicatively link being a specific web page and/or web link which the communication assembly 24 can access directly, as in FIG. 1. Nevertheless, as can be seen from the preceding, once an enhancement registry 50 is defined for a particular media selection, that media selection, whether old or new, and regardless of the type of delivery medium, including live delivery and/or delivery from a storage device, may be effectively enhanced without required alteration and/or modification thereof and/or without requiring any specific direct programming thereof.

From the preceding can be seen that the present invention is further directed towards a method of enhancing existing media content, the method preferably employed utilizing the media enhancement system 10 also of the present invention. Looking in particular to the method, however, it preferably includes the initial step of generating and storing an enhancement registry for a particular media selection. As indicated this may include a plurality of enhancement registries for one or a plurality of media selections. Moreover, the generated and stored enhancement registry preferably includes at least time data associated with the media selection, and may include frame location data and other data associated with the media selection. Furthermore, the enhancement registry that is generated and stored may include at least one communicative link to additional materials. Subsequently, a media storage medium containing a media selection is associated with a corresponding media player for delivery. The media selection can then be identified such that eventually a corresponding enhancement registry can be identified as well, and the media selection played, such as via a video monitor, audio monitor, etc.

Preferably after the media selection is being played, but not necessarily, a user input is received. Upon receipt of the user input at least a time marker of the media selection at a time that corresponds to the receipt of the user input is identified, and in at least one embodiment at least a position and/or location of a corresponding location designator for the portion of the media selection been delivered at that time is also identified. The time marker and/or the location data can then be correlated with the time data and/or frame location data provided with the enhancement registry, and a corresponding communicative link is activated in response thereto. Once the communicative link is identified and activated, additional materials can be delivered to the user and/or recipient of the delivery of the media selection, either immediately and/or at any point subsequent.

Also, in some embodiment wherein an activation assembly is locally provided but an enhancement registry 50 is remotely provided, an additional step of transmitting and/or downloading the enhancement registry 50 to a local processor associated with the activation assembly 30, may also be provided.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. A method of enhancing existing media content comprising:
   a) generating and storing an enhancement registry for a media selection from said media content, said enhancement registry including at least one time data associated with a corresponding time point during the play of said media selection, at least one frame location data associated with a specific location on at least one frame of said media selection and at least one communicative link to additional materials, wherein each of said at least one communicative links is associated with a different time data and frame location data associated with said media selection;
   b) associating a media storage medium containing said media selection with a corresponding media player;
   c) associating said media selection with time markers related to the stages of said media selection and to at least one of said time data;
   d) playing the media selection on said corresponding media player for delivery to a user;
   e) receiving a user input and identifying the time of receipt;
   f) identifying the time marker of said media selection that corresponds to the time of receipt of said user input and a location marker of said media selection that corresponds to said user input;
   g) correlating said identified time marker with at least one of said time data and said identified location marker with at least one of said frame location data of said enhancement registry to determine a communicative link associated with the at least one of said time data and the at least one of said frame location data; and
   h) activating said determined communicative link associated with the at least one of said time data and said frame location data in response thereto, to deliver additional material related to a stage of said media selection to a user in accordance with the receipt of a user input.

2. The method of claim 1 further comprising generating and storing said enhancement registry including a plurality of said communicative links, each such link being associated with a different stage of said media selection and referenced to said different stage by said associated time data, and correlating said time data with said time markers with an activation assembly communicating with said enhancement registry.

3. The method of claim 2 wherein at least one of said plurality of said communicative links, which is associated with a stage of said media selection referenced by said associated time data, is activated by said activation assembly in response to the correlation of said associated time data with a time marker corresponding to the time of receipt of said user input to deliver additional material related to said stage of said media selection to a user.

4. The method of claim 1 wherein activation of said communicative link further comprises retrieving said additional materials from a local storage medium.

5. The method of claim 1 wherein activation of said communicative link further comprises retrieving said additional materials from said media storage medium.

6. The method of claim 1 wherein activation of said communicative link further comprises retrieving said additional materials from a remote storage medium.

7. The method of claim 1 further comprising storing said enhancement registry for said media selection on a local storage medium.

8. The method of claim 1 further comprising storing said enhancement registry for said media selection on said media storage medium containing said media selection.

9. The method of claim 1 further comprising storing said enhancement registry for said media selection on a remote storage medium.

10. The method of claim 1 further comprising establishing a communicative link between said media player and a remote server.

11. A media enhancement system comprising:
a) a media player structured to deliver a media selection to a user;
b) an enhancement registry associated with said media selection, said enhancement registry including at least one time data associated with a corresponding time point during play of said media selection, at least one frame location data associated with a specific location on at least one frame of said media selection and at least one communicative link to additional materials, wherein each of said at least one communicative links is associated with a different one of said time data and frame location data;
c) a user interface operatively associated with said media player and structured to receive a user input at least during delivery of said media selection by said media player, said user interface includes a location indicator structured to identify a location on at least a frame of said media selection, wherein said user interface further structured to generate a location marker corresponding to a position of said location indicator associated with a user input;
d) said media player structured to receive an indication from said user interface of the time of receipt of a user input to identify a time marker associated with said media selection that corresponds to the time of receipt of said user input; and
e) an activation assembly structured to access said enhancement registry, correlate the identified time marker with at least one of said time data and said identified location marker with at least one of said frame location data of said enhancement registry to identify one of said at least one communicative links associated with the at least one of said time data and said frame location data and to correspondingly activate said identified communicative link for delivery of said additional materials to the user in accordance with the receipt of a user input,
wherein said enhancement registry includes a different one of said communicative links in association with each of a plurality of said location markers for a particular one of said time markers.

12. The media enhancement system recited in claim 11 wherein said enhancement registry is separate from said media selection.

13. The media enhancement system recited in claim 11 further comprising a communication assembly structured to establish a communicative link between said media player and a remote network including said enhancement registry.

14. The media enhancement system recited in claim 13 wherein said activation assembly is maintained by said media player.

15. The media enhancement system recited in claim 11 further comprising a remote network and wherein said additional materials accessible utilizing said identified communicative link and accessible from said remote network.

16. The media enhancement system recited in claim 11 wherein said enhancement registry is stored remotely from said media player.

17. The media enhancement system recited in claim 16 wherein said enhancement registry is communicated to said media player, said media player including said activation assembly.

18. The media enhancement system recited in claim 16 wherein said media player communicates said time marker that corresponds to receipt of said user input to a remote server, said remote server including said activation assembly.

19. The media enhancement system recited in claim 18 wherein said identified communicative link is maintained on a media storage medium.

20. The media enhancement system recited in claim 18 wherein said identified communicative link is maintained by said remote server.

21. The media enhancement system recited in claim 18 wherein said identified communicative link includes a web address structured to be accessed by said media player so as to access said additional materials.

22. The media enhancement system recited in claim 11 wherein said additional materials accessible utilizing said identified communicative link are structured to be selectively delivered as determined by the user.

23. The media enhancement system recited in claim 11 wherein said additional materials accessible utilizing said identified communicative link are structured to be delivered in response to said user input.

24. The media enhancement system recited in claim 11 wherein said enhancement registry corresponding to said media selection is structured to be communicated to said media player and at least temporarily stored by said media player.

25. The media enhancement system recited in claim 11 including a plurality of said communicative links.

26. The media enhancement system recited in claim 11 wherein said activation assembly is structured to store a plurality of said communicative links for selection delivery of said additional materials to said user.

27. The media enhancement system recited in claim 11 wherein said additional materials are delivered to said user via said media player.

28. The media enhancement system recited in claim 11 wherein said activation assembly is independent from said media player.

29. The media enhancement system recited in claim 28 wherein said activation assembly includes a communicative link to a remote network.

30. The media enhancement system recited in claim 11 wherein said additional materials include informational material.

31. The media enhancement system recited in claim 11 wherein said additional materials include e-commerce materials.

32. The media enhancement system recited in claim 31 wherein said e-commerce materials are structured to facilitate a remote purchase.

* * * * *